US011919579B2

(12) United States Patent
Hasegawa et al.

(10) Patent No.: US 11,919,579 B2
(45) Date of Patent: Mar. 5, 2024

(54) POWER SUPPLY SYSTEM

(71) Applicants: JTEKT CORPORATION, Kariya (JP); TOYOTA JIDOSHA KABUSHIKI KAISHA, Toyota (JP)

(72) Inventors: Kazuma Hasegawa, Anjo (JP); Toshihiro Takahashi, Nishio (JP); Yuji Fujita, Okazaki (JP); Kenichi Abe, Okazaki (JP); Yugo Nagashima, Anjo (JP); Yuuta Kajisawa, Okazaki (JP); Takashi Koudai, Okazaki (JP); Hiroaki Hanzawa, Toyota (JP); Atsushi Satou, Toyota (JP); Yosuke Yamashita, Nagoya (JP); Shintaro Takayama, Toyota (JP); Tokuaki Hibino, Toyota (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 232 days.

(21) Appl. No.: 17/540,000

(22) Filed: Dec. 1, 2021

(65) Prior Publication Data

US 2022/0169304 A1 Jun. 2, 2022

(30) Foreign Application Priority Data

Dec. 2, 2020 (JP) ................. 2020-200555

(51) Int. Cl.
*B62D 5/04* (2006.01)
*B60R 16/02* (2006.01)
*B62D 6/10* (2006.01)

(52) U.S. Cl.
CPC .............. *B62D 5/046* (2013.01); *B60R 16/02* (2013.01); *B62D 5/0406* (2013.01); *B62D 5/0481* (2013.01); *B62D 6/10* (2013.01)

(58) Field of Classification Search
CPC .... B62D 5/046; B62D 5/0406; B62D 5/0481; B62D 6/10; B62D 5/0457; B60R 16/02
See application file for complete search history.

(56) References Cited

U.S. PATENT DOCUMENTS

2013/0079993 A1* 3/2013 Sugiyama .............. B62D 5/046
701/42
2019/0252909 A1 8/2019 Sugiyama

FOREIGN PATENT DOCUMENTS

EP 3 528 361 A1 8/2019
JP 2010-120624 A 6/2010
JP 2019-140883 A 8/2019

OTHER PUBLICATIONS

Sep. 9, 2022 Search Report issued in European Patent Application No. 21211628.9.

* cited by examiner

*Primary Examiner* — Jacob M Amick
(74) *Attorney, Agent, or Firm* — Oliff PLC

(57) ABSTRACT

A power supply system includes a system control unit, an auxiliary power supply, and an auxiliary-power-supply control unit. The system control unit and the auxiliary-power-supply control unit are configured such that information of at least one control unit of the system control unit and the auxiliary-power-supply control unit is able to be output to another control unit of the system control unit and the auxiliary-power-supply control unit. The at least one control unit is configured to output information indicating that an operation of the at least one control unit is stopped to the other control unit when the at least one control unit stops the operation of the at least one control unit.

7 Claims, 5 Drawing Sheets

POWER SUPPLY SYSTEM

CROSS-REFERENCE TO RELATED APPLICATION

This application claims priority to Japanese Patent Application No. 2020-200555 filed on Dec. 2, 2020, incorporated herein by reference in its entirety.

BACKGROUND

1. Technical Field

The disclosure relates to a power supply system.

2. Description of Related Art

For example, a system control unit configured to control an operation of an electric power steering system (hereinafter referred to as EPS) for a vehicle performs assist control using electric power supplied from a main power supply mounted in the vehicle. The EPS is a system that performs a desired function. Supply of electric power to the system control unit from the main power supply may be assisted using a function of an auxiliary power supply which is provided separately from the main power supply.

Japanese Unexamined Patent Application Publication No. 2019-140883 (JP 2019-140883 A) discloses an EPS control unit, and an auxiliary-power-supply control unit that controls an operation of an auxiliary power supply operating to assist supply of electric power from a main power supply to the EPS control unit by stepping up the electric power, as an example of a manner of assisting the supply of electric power.

SUMMARY

Supply of electric power from the main power supply is switched between permission and stopping, and a status of an operation of the system control unit using the electric power supplied from the main power supply is set in correlation with a status of the supply of electric power from the main power supply. Similarly, a status of an operation of the auxiliary-power-supply control unit that controls an operation of the auxiliary power supply for assisting the supply of electric power from the main power supply is set in correlation with the status of the supply of electric power from the main power supply. There is demand for taking measures regarding the system control unit and the auxiliary-power-supply control unit such that the control units do not fall into an unexpected situation such as a situation in which one of the control units operates continuously when the one control unit should stop in a relation with the other control unit, or a situation in which one of the control units stops the operation thereof when the one control unit should not stop in the relation with the other control unit.

An aspect of the disclosure relates to a power supply system including a system control unit configured to operate using electric power supplied from a main power supply, so as to control an operation of a system that performs a desired function; an auxiliary power supply provided separately from the main power supply and configured to provide assistance in supply of the electric power to the system control unit according to a status of supply of the electric power from the main power supply; and an auxiliary-power-supply control unit configured to control a status of supply of the electric power to the system control unit from the auxiliary power supply such that the assistance is provided. The system control unit and the auxiliary-power-supply control unit are configured such that information of at least one control unit of the system control unit and the auxiliary-power-supply control unit is able to be output to another control unit of the system control unit and the auxiliary-power-supply control unit. The at least one control unit is configured to output information indicating that an operation of the at least one control unit is stopped to the other control unit when the at least one control unit stops the operation of the at least one control unit.

With this configuration, when one control unit of the system control unit and the auxiliary-power-supply control unit stops the operation thereof, the other control unit can receive information indicating that the operation of the one control unit is stopped, from the one control unit. In this case, the other control unit can determine whether the operation of the other control unit is to be stopped by considering whether the one control unit stops the operation thereof or continues the operation thereof when the other control unit is to stop the operation thereof. Accordingly, it is possible to set a rule regarding the system control unit and the auxiliary-power-supply control unit to prevent a situation where one control unit continues to operate when the one control unit should stop the operation thereof in a relation with the operation status of the other control unit, or one control unit stops the operation thereof when the one control unit should not stop the operation thereof in the relation with the operation status of the other control unit. As a result, it is possible to reduce the possibility that the system control unit and the auxiliary-power-supply control unit fall into an unexpected situation.

In the power supply system according to the aspect, the status of the supply of the electric power from the main power supply and an operation status of a mounting destination of the system may be correlated with each other; and the at least one control unit may be configured to determine whether the operation of the at least one control unit is to be stopped based on the operation status of the mounting destination of the system, and to output information indicating that the operation of the at least one control unit is stopped to the other control unit when the at least one control unit determines that the operation of the at least one control unit is stopped.

With this configuration, it is possible to set a rule such that each of the system control unit and the auxiliary-power-supply control unit stops the operation thereof when it should stop the operation in consideration of the status of the supply of the electric power from the main power supply, that is, the operation status of the mounting destination of the system. This configuration is effective for allowing the system control unit to perform appropriate control based on the operation status of the mounting destination of the system.

In the power supply system according to the aspect, in a case where one control unit of the system control unit and the auxiliary-power-supply control unit is a first control unit, and another control unit of the system control unit and the auxiliary-power-supply control unit is a second control unit, the first control unit may be configured to receive information indicating an operation status of a mounting destination of the system from an external control unit that is provided in the mounting destination of the system separately from the system control unit and the auxiliary-power-supply control unit such that the operation status of the mounting destination of the system is able to be determined; the first control unit may be configured to output information indicating that the first control unit stops an operation of the first control unit to the second control unit when determining that an operation of the mounting destination of the system is stopped, on a condition that stopping of the operation of the mounting destination of the system is determined using the information indicating the operation status of the mounting destination of the system when the first control unit stops the operation of the first control unit; and the second control unit may be configured to determine whether an operation of the second control unit is to be stopped using the information indicating that the first control unit stops the operation of the first control unit, the information being input from the first control unit.

With this configuration, it is possible to set a rule such that each of the system control unit and the auxiliary-power-supply control unit stops the operation thereof when it should stop the operation thereof using the first control unit that can receive information indicating the operation status of the mounting destination of the system from the external control unit as a main control unit (master control unit). This configuration is effective for reducing the possibility that the system control unit and the auxiliary-power-supply control unit fall into an unexpected situation.

In the power supply system according to the aspect, the system control unit and the auxiliary-power-supply control unit may be configured to determine an operation status of a mounting destination of the system using a source voltage as information indicating the status of the supply of the electric power from the main power supply.

With this configuration, the system control unit and the auxiliary-power-supply control unit can determine the operation status of the mounting destination of the system, for example, even when information indicating the operation status of the mounting destination of the system cannot be received from an external control unit or when information indicating the operation status of the mounting destination of the system from the external control unit cannot be used. In addition to the information indicating the status of the supply of the electric power from the main power supply, a plurality of pieces of information from different information sources such as information indicating the operation status of the mounting destination of the system from the external control unit may be used to determine the operation status of the mounting destination of the system. In this case, it is possible to improve accuracy of determination as to the operation status of the mounting destination of the system.

In the power supply system according to the aspect, the auxiliary power supply may provide the assistance in the supply of the electric power by backing up the supply of the electric power to the system control unit instead of the main power supply on a condition that there is a decrease in the electric power supplied from the main power supply; the power supply system may further include a selection circuit provided between the main power supply and the auxiliary power supply, and the system control unit, the selection circuit being configured to select the electric power from one of the main power supply and the auxiliary power supply such that the electric power is supplied to the system control unit, the one of the main power supply and the auxiliary power supply having a higher supply voltage than a supply voltage of another of the main power supply and the auxiliary power supply; and the auxiliary-power-supply control unit may be configured to control the auxiliary power supply such that the electric power from at least the auxiliary power supply is supplied to the system control unit via the selection circuit while the main power supply supplies the electric power to the system control unit.

With this configuration, electric power of a power supply with a higher supply voltage out of the main power supply and the auxiliary power supply is selected through the function of the selection circuit. In this case, for example, by considering that the auxiliary power supply backs up the supply of the electric power when there is a decrease in the electric power supplied from the main power supply, it is conceivable that the auxiliary power supply may back up the supply of the electric power to the system control unit instead of the main power supply even in a state in which the supply of the electric power from the main power supply is stopped. This situation can be addressed by setting a rule such that the auxiliary-power-supply control unit can stop the operation thereof when the system control unit stops the operation thereof. In this way, in the case where the auxiliary power supply backs up the supply of the electric power when there is a decrease in the electric power supplied from the main power supply, it is possible to reduce the possibility that the system control unit and the auxiliary-power-supply control unit fall into an unexpected situation.

The selection circuit may include a first diode that is provided in a first power supply path which is a path for supplying the electric power from the main power supply to the system control unit; and a second diode that is connected to a portion of the first diode provided in the first power supply path, the portion of the first diode being located on a side of the system control unit, and the second diode being provided in a second power supply path which is a path for supplying the electric power from the auxiliary power supply to the system control unit.

In the power supply system according to the aspect, the system may be a steering system that is mounted in a vehicle and functions to operate at least one of a steering wheel and a turning wheel which are provided in the vehicle; and the system control unit may be configured to control an operation of the steering system.

With the steering system employing the power supply system with this configuration, it is possible to reduce the possibility that the system control unit and the auxiliary-power-supply control unit fall into an unexpected situation. In this case, it is possible to effectively achieve improvement in marketability of the steering system.

With the power supply system according to the aspect of the disclosure, it is possible to reduce the possibility that the system control unit and the auxiliary-power-supply control unit fall into an unexpected situation.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Hereinafter, a power supply system according to a first embodiment will be described with reference to the accompanying drawings. The power supply system according to this embodiment is applied to constitute a part of a steering system 2 which is mounted in a vehicle.

Figure 1:
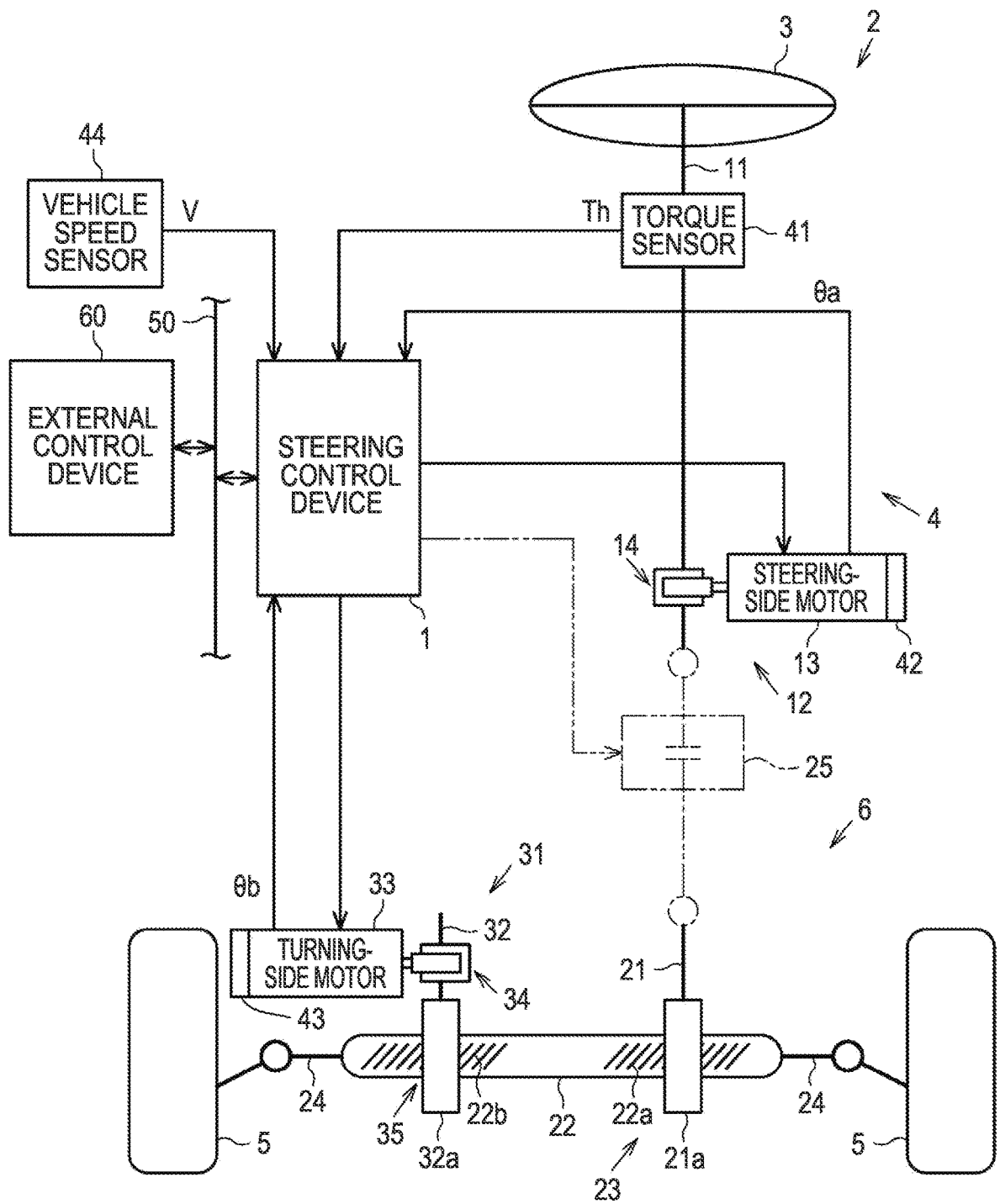
FIG. 1 is a diagram schematically illustrating a configuration of a steering system according to a first embodiment.

As illustrated in FIG. 1, the steering system 2 is a steer-by-wire steering system. The steering system 2 includes a steering control device 1 that controls an operation of the steering system 2. The steering system 2 includes a steering unit 4 that is steered by a driver using a steering wheel 3 and a turning unit 6 that turns turning wheels 5 according to steering input to the steering unit 4 by a driver. The steering system 2 according to this embodiment has a structure in which a power transmission path between the steering unit 4 and the turning unit 6 is normally mechanically cut off.

The steering unit 4 includes a steering shaft 11 to which the steering wheel 3 is fixed and a steering actuator 12 that applies a steering reaction force which is a force against the driver's steering to the steering wheel 3 via the steering shaft 11. The steering actuator 12 includes a steering-side motor 13 that serves as a drive source and a steering-side speed reduction mechanism 14 that reduces rotation (i.e., reduces the rotational speed) of the steering-side motor 13 and transmits the reduced rotation to the steering shaft 11. For example, a three-phase brushless motor is employed as the steering-side motor 13 according to this embodiment.

The turning unit 6 includes a first pinion shaft 21 and a rack shaft 22 that is a turning shaft connected to the first pinion shaft 21. The first pinion shaft 21 and the rack shaft 22 are arranged at a predetermined crossing angle. A first rack and pinion mechanism 23 is configured by causing first pinion teeth 21a formed in the first pinion shaft 21 and first rack teeth 22a formed in the rack shaft 22 to engage with each other. Tie rods 24 are respectively connected to both ends of the rack shaft 22. The distal ends of the tie rods 24 are respectively connected to knuckles (not illustrated) to which the right and left turning wheels 5 are assembled.

The turning unit 6 includes a turning actuator 31 that applies a turning force for turning the turning wheels 5 to the rack shaft 22. The turning actuator 31 applies a turning force to the rack shaft 22 via a second pinion shaft 32. The turning actuator 31 includes a turning-side motor 33 that serves as a drive source and a turning-side speed reduction mechanism 34 that reduces rotation (i.e., reduces the rotational speed) of the turning-side motor 33 and transmits the reduced rotation to the second pinion shaft 32. The second pinion shaft 32 and the rack shaft 22 are arranged at a predetermined crossing angle. A second rack and pinion mechanism 35 is configured by causing second pinion teeth 32a formed in the second pinion shaft 32 and second rack teeth 22b formed in the rack shaft 22 to engage with each other.

In the steering system 2 having the aforementioned configuration, the second pinion shaft 32 is rotationally driven by the turning actuator 31 according to a driver's steering operation and this rotation is converted to an axial motion of the rack shaft 22 by the second rack and pinion mechanism 35, whereby the turning angle of the turning wheels 5 is changed. At this time, as a steering reaction force against the driver's steering, a force acting in a direction opposite to the driver's steering direction is applied to the steering wheel 3 from the steering actuator 12.

The reason why the first pinion shaft 21 is provided is that the rack shaft 22 is supported together with the first pinion shaft 21 in a housing which is not illustrated.

That is, by a support mechanism (not illustrated) which is provided in the steering system 2, the rack shaft 22 is supported to be movable in an axial direction thereof and is pressed toward the first pinion shaft 21 and the second pinion shaft 32. Accordingly, the rack shaft 22 is supported in the housing. Another support mechanism that supports the rack shaft 22 in the housing may be provided instead of using the first pinion shaft 21.

As illustrated in FIG. 1, the steering control device 1 is connected to the steering-side motor 13 and the turning-side motor 33. The steering control device 1 controls operations of the steering-side motor 13 and the turning-side motor 33. That is, the steering control device 1 performs control such that the steering system 2 operates to exhibit a desired function of a steer-by-wire steering system by controlling the operations of the motors 13 and 33.

A torque sensor 41 that detects a steering torque Th applied to the steering shaft 11 is connected to the steering control device 1. The torque sensor 41 is provided on the steering shaft 11 at a position closer to the steering wheel 3 than a connection part connected to the steering-side speed reduction mechanism 14. The torque sensor 41 detects the steering torque Th based on an amount of torsion of a torsion bar which is provided at a portion of the steering shaft 11.

A steering-side rotation angle sensor 42 and a turning-side rotation angle sensor 43 are connected to the steering control device 1. The steering-side rotation angle sensor 42 detects a steering-side rotation angle θa of the steering-side motor 13 as a relative angle within a range of 360 degrees. The turning-side rotation angle sensor 43 detects a turning-side rotation angle θb of the turning-side motor 33 as a relative angle within a range of 360 degrees.

A vehicle speed sensor 44 is connected to the steering control device 1. The vehicle speed sensor 44 detects a vehicle speed value V which is set as information indicating a travel speed of a vehicle. An external control device 60 is connected to the steering control device 1 via an onboard network 50 such as a CAN. The external control device 60 is provided in the vehicle separately from the steering control device 1 and controls an operation of a system that exhibits a desired function which is different from the function exhibited by the steering system 2. The steering control device 1 receives information from the external control device 60 via the onboard network 50.

Figure 2:
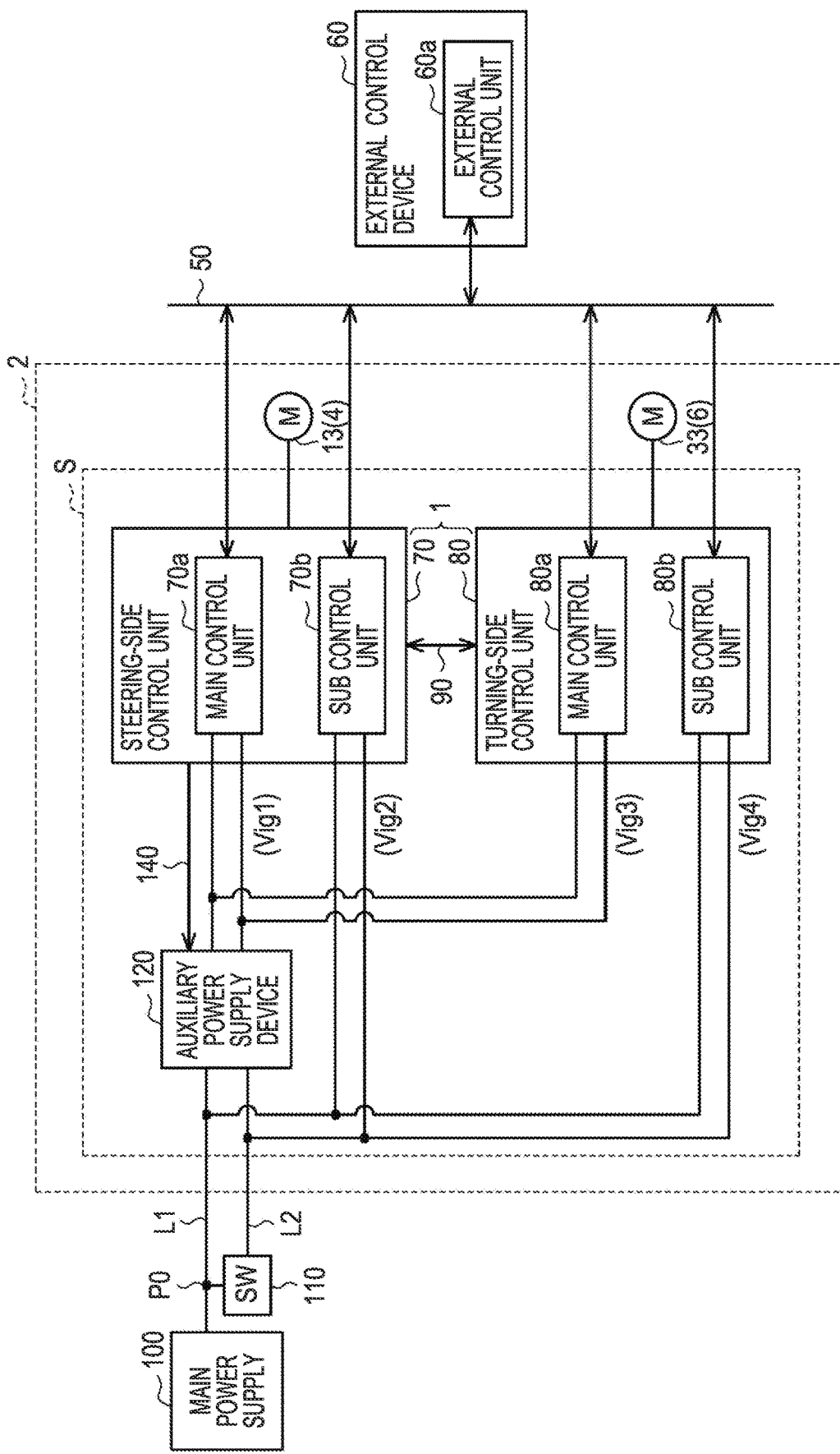
FIG. 2 is a block diagram of a power supply system according to the first embodiment.

An electrical configuration of the steering control device 1 will be described below. As illustrated in FIG. 2, the steering control device 1 includes a steering-side control unit 70 that controls supply of electric power to the steering-side motor 13 and a turning-side control unit 80 that controls supply of electric power to the turning-side motor 33. The steering-side control unit 70 and the turning-side control unit 80 transmit and receive information to and from each other via a local network 90 such as a serial communication network. The steering-side control unit 70 is provided as a part of the configuration of the steering unit 4. The turning-side control unit 80 is provided as a part of the configuration of the turning unit 6.

The steering-side control unit 70 calculates a reaction control value serving as a target of a steering reaction force of the steering wheel 3 which is to be generated by the steering-side motor 13 based on detection results from various sensors. The steering-side control unit 70 controls supply of electric power to the steering-side motor 13 based on the reaction control value. The turning-side control unit 80 calculates a turning control value serving as a target of a turning force which is to be generated by the turning-side motor 33 based on the detection results from the sensors. The turning-side control unit 80 controls supply of electric power to the turning-side motor 33 based on the turning control value.

The steering-side control unit 70 includes a central processing unit (CPU) and a memory which are not illustrated and the CPU executes a program stored in the memory at intervals of a predetermined calculation cycle. Accordingly, various processes are performed. The steering-side control unit 70 includes two systems, i.e., a main control unit 70a and a sub control unit 70b as control systems which are realized by combination of a CPU and a memory such that various processes are performed. In this embodiment, the steering-side control unit 70 operates in a control scheme of a master-slave system in which the main control unit 70a is used as a master control unit and the sub control unit 70b is used as a slave control unit. The same applies to the turning-side control unit 80. That is, the turning-side control unit 80 includes two systems, i.e., a main control unit 80a and a sub control unit 80b as control systems which are realized by combination of a CPU and a memory such that various processes are performed, and the control units 80a and 80b are configured to operate in a control scheme of a master-slave system.

The control units 70a and 70b of the steering-side control unit 70 and the control units 80a and 80b of the turning-side control unit 80 are configured to communicate with each other via a local network 90. The control units 70a and 70b of the steering-side control unit 70 and the control units 80a and 80b of the turning-side control unit 80 are configured to communicate with an external control unit 60a of the external control device 60 via the onboard network 50.

A main power supply 100 is connected to the steering system 2. The main power supply 100 is a secondary battery mounted in the vehicle, serves as a power source of electric power which is supplied to operate the motors 13 and 33, and serves as a power source of electric power which is supplied to operate the steering-side control unit 70 and the turning-side control unit 80.

A start switch 110 of the vehicle such as an ignition switch is provided between the steering system 2 and the main power supply 100. The start switch 110 is provided at a portion of a power supply line L2 branching from a connection point PO of a power supply line L1 out of two power supply lines L1 and L2 connecting the steering system 2 and the main power supply 100. The start switch 110 is operated when a travel drive source of the vehicle such as an engine is operated and various functions are started to operate the vehicle. The power supply line L2 is switched on or off through the operation of start switch 110. In this embodiment, an operation status of the steering system 2 that can exhibit a desired function of a steer-by-wire steering system is correlated with an operation status of the vehicle. The power supply line L1 is basically normally switched on, but the power supply line L1 is indirectly switched on or off by the function of the steering system 2 according to the operation status of the steering system 2. That is, the operation status of the steering system 2 is correlated with switching-on/off of the power supply lines L1 and L2 which is a status of supply of electric power from the main power supply 100.

In the steering system 2, the power supply lines L1 and L2, that is, the main power supply 100, is/are connected particularly to the main control unit 70a of the steering-side control unit 70 via an auxiliary power supply device 120. The power supply lines L1 and L2, that is, the main power supply 100, is/are directly connected particularly to the sub control unit 70b of the steering-side control unit 70 without passing through the auxiliary power supply device 120. The same applies to the turning-side control unit 80, and the power supply lines L1 and L2, that is, the main power supply 100, is/are connected particularly to the main control unit 80a of the turning-side control unit 80 via the auxiliary power supply device 120. The power supply lines L1 and L2, that is, the main power supply 100, is/are directly connected particularly to the sub control unit 80b of the turning-side control unit 80 without passing through the auxiliary power supply device 120. That is, in this embodiment, the single auxiliary power supply device 120 is shared by the steering-side control unit 70 and the turning-side control unit 80.

The auxiliary power supply device 120 does not have a function of receiving information from the external control device 60 via the onboard network 50. That is, the auxiliary power supply device 120 is physically isolated from the onboard network 50 and is configured not to receive information from the external control device 60 via the onboard network 50. On the other hand, the auxiliary power supply device 120 is configured to communicate with the main control unit 70a of the steering-side control unit 70 via a dedicated signal line 140. The auxiliary power supply device 120 is configured not to communicate with the main control unit 80a of the turning-side control unit 80 via a dedicated signal line. This is because a position at which the auxiliary power supply device 120 according to this embodiment is provided is set to be between the steering unit 4 and the turning unit 6 and to be closer to the steering unit 4 in the steering system 2.

In this embodiment, the auxiliary power supply device 120 is prepared as an auxiliary power supply device for the steering-side control unit 70 and the turning-side control unit 80, that is, the steering system 2. The auxiliary power supply device 120, the steering-side control unit 70, and the turning-side control unit 80 constitute a power supply system S. The power supply system S is applied as a power supply system for the steering unit 4 and the turning unit 6, that is, the steering system 2.

A configuration of the power supply system S will be described below in detail. Herein, a configuration associated with the steering unit 4 will be mainly described and only a configuration different from the configuration associated with the steering unit 4 will be described as the configuration associated with the turning unit 6.

Figure 3:
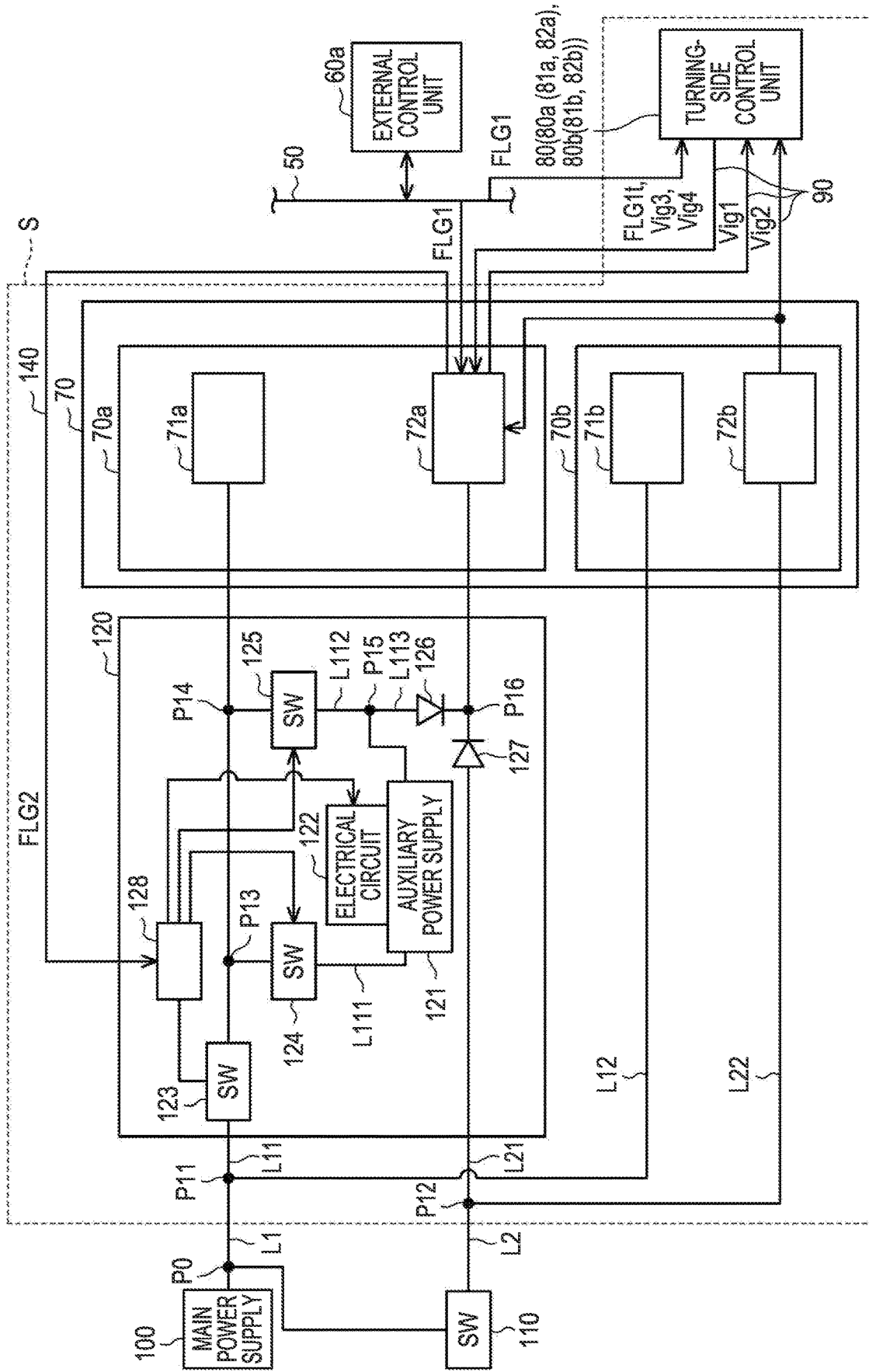
FIG. 3 is a block diagram of a power supply system of a steering unit according to the first embodiment; A portion (a) in FIG. 4 is a diagram illustrating a turning-on/off state of a start switch, a portion (b) in FIG. 4 is a diagram illustrating detection states of source voltages, portions (c) and (d) in FIG. 4 are diagrams illustrating an output state of a vehicle stop flag, a portion (e) in FIG. 4 is a diagram illustrating an output state of a stop permission flag, a portion (f) in FIG. 4 is a diagram illustrating an operation state of an auxiliarypower-supply control unit, and a portion (g) in FIG. 4 is a diagram illustrating a supply state of electric power to control units.

As illustrated in FIG. 3, electric power from the main power supply 100 is supplied to a power circuit 71a of the main control unit 70a via a power supply line L11 branching from a connection point P11 of the power supply line L1. The power circuit 71a is a circuit that handles more electric power and includes, for example, an inverter that converts DC power of the main power supply 100 to AC power. Electric power from the main power supply 100 is supplied to a control circuit 72a of the main control unit 70a via a power supply line L21 branching from a connection point P12 of the power supply line L2. The control circuit 72a is a circuit that controls the steering-side motor 13 and includes, for example, a CPU and a memory.

Electric power from the main power supply 100 is supplied to a power circuit 71b of the sub control unit 70b via a power supply line L12 branching from the connection point P11 of the power supply line L1. The power circuit 71b has the same configuration as that of the power circuit 71a. Electric power from the main power supply 100 is supplied to a control circuit 72b of the sub control unit 70b via a power supply line L22 branching from the connection point P12 of the power supply line L2. The control circuit 72b has the same configuration as the control circuit 72a.

The turning-side control unit 80 has a configuration corresponding to the steering-side control unit 70. That is, the turning-side control unit 80 has a configuration of the main control unit 80a corresponding to the power circuit 71a and the control circuit 72a. The turning-side control unit 80 has a configuration of the sub control unit 80b corresponding to the power circuit 71b and the control circuit 72b. That is, as illustrated in FIG. 3, the turning-side control unit 80 includes a power circuit 81a and a control circuit 82a in the main control unit 80a. Similarly, the turning-side control unit 80 includes a power circuit 81b and a control circuit 82b in the sub control unit 80b. In the main control unit 80a, the control circuit 82a is different from the control circuit 72a in that the control circuit 82a is configured not to output information to an auxiliary-power-supply control unit 128 (which will be described later) of the auxiliary power supply device 120 via a signal line 140.

The configuration of the auxiliary power supply device 120 will be described below in detail. As illustrated in FIG. 3, the auxiliary power supply device 120 includes an auxiliary power supply 121, an electrical circuit 122, switches 123, 124, and 125, diodes 126 and 127, and an auxiliary-power-supply control unit 128.

For example, the auxiliary power supply 121 is a capacitor such as a lithium-ion capacitor having the same function as the function of a secondary battery. The auxiliary power supply 121 serves as a power source of electric power which is supplied to operate the steering-side motor 13 and also serves as a power source of electric power which is supplied to operate the steering-side control unit 70. The same applies to the turning unit 6. That is, the auxiliary power supply 121 serves as a power source of electric power which is supplied to the turning-side motor 33 and also serves as a power source of electric power which is supplied to the turning-side control unit 80.

As expressed by the following Expression (A), a voltage V2 of the auxiliary power supply 121 is set to a value which is higher than a voltage V0 required for causing the motors 13 and 33 or the control units 70 and 80 to operate appropriately and lower than a voltage V1 of the main power supply 100.

$$V1 > V2 > V0 \quad (A)$$

In the auxiliary power supply device 120, the auxiliary power supply 121 is connected to a connection point P11 of a power supply line L11 via a power supply line L111 branching from a connection point P13 of the power supply line L11. In the auxiliary power supply device 120, the auxiliary power supply 121 is connected to the connection point P11 of the power supply line L11 via a power supply line L112 branching from a connection point P14 of the power supply line L11. Here, the connection point P14 is located on the downstream side of the connection point P13, that is, the connection point P14 is located closer to the steering-side control unit 70 (the turning-side control unit 80) than the connection point P13 is. The auxiliary power supply 121 serves to assist supply of electric power to the steering-side control unit 70 (the turning-side control unit 80) according to a status of supply of electric power from the main power supply 100. In this embodiment, the auxiliary power supply 121 backs up the supply of electric power to the steering-side control unit 70 (the turning-side control unit 80) instead of the main power supply 100 on the condition that there is a decrease in an amount of electric power supplied from the main power supply 100.

The electrical circuit 122 switches a state of connection to the power supply line L11 such that the auxiliary power supply 121 is charged with or discharges electric power. The electrical circuit 122 switches the state of connection to the power supply line L11 such that the auxiliary power supply 121 is disconnected in order not to discharge electric power from the auxiliary power supply 121.

The switch 123 is provided at a portion of the power supply line L11 in the auxiliary power supply device 120. The switch 123 is located on the upstream side of the connection point P13, that is, the switch 123 is located closer to the main power supply 100 than the connection point P13 is. The switch 123 connects and disconnects the power supply line L11.

The switch 124 is provided at a portion of the power supply line L111 in the auxiliary power supply device 120. The switch 124 connects and disconnects the power supply line L111. The switch 125 is located at a portion of the power supply line L112 in the auxiliary power supply device 120. The switch 125 connects and disconnects the power supply line L112.

A connection point P15 is set in the power supply line L112. In the auxiliary power supply device 120, the connection point P15 in the power supply line L112 and a connection point P16 in the power supply line L21 are connected by a power supply line L113.

The diode 126 is provided at a portion of the power supply line L113. A cathode of the diode 126 is connected to the connection point P16 in the power supply line L21. An anode of the diode 126 is connected to the connection point P15 in the power supply line L113.

The diode 127 is provided at a portion of the power supply line L21. A cathode of the diode 127 is connected to the connection point P16 in the power supply line L21. An anode of the diode 127 is connected to the connection point P12 in the power supply line L21.

Each of the diodes 126 and 127 permits a flow of electric power from the anode to the cathode and restrains a flow of electric power from the cathode to the anode.

The diodes 126 and 127 constitute an OR circuit that supplies electric power from a power supply with a higher supply voltage out of the main power supply 100 and the auxiliary power supply 121 to the control circuit 72a. In other words, the diodes 126 and 127 constitute an OR circuit that supplies electric power from one of the main power supply 100 and the auxiliary power supply 121 to the control circuit 72a, the one of the main power supply 100 and the auxiliary power supply 121 having a higher supply voltage than a supply voltage of the other. The OR circuit constituted by the diodes 126 and 127 is a so-called wired OR. The OR circuit constituted by the diodes 126 and 127 corresponds to a selection circuit that selects electric power from a power supply with a higher supply voltage out of the main power supply 100 and the auxiliary power supply 121 such that the electric power is supplied to the steering-side control unit 70 (the turning-side control unit 80).

The auxiliary-power-supply control unit 128 includes a central processing unit (CPU) and a memory which are not illustrated and the CPU executes a program stored in the memory at intervals of a predetermined calculation cycle. Accordingly, various processes are performed.

Specifically, the auxiliary-power-supply control unit 128 controls switching of the connection state of the electrical circuit 122 and controls switching-on/off of the switches 123, 124, and 125. The auxiliary-power-supply control unit 128 monitors a voltage of the main power supply 100. The auxiliary-power-supply control unit 128 determines that a source voltage Vb of the main power supply 100 has decreased when the source voltage Vb of the main power supply 100 is lower than a threshold voltage Vth1 as expressed by the following Expression (B). The threshold voltage Vth1 serves as a reference for determining a decrease in voltage of the main power supply 100 and is set based on the voltage V0 required for appropriately operating the motors 13 and 33 or the control units 70 and 80. In this embodiment, the threshold voltage Vth1 is set to the same value as the voltage V0.

$$Vb < Vth1 \qquad (B)$$

When a decrease in voltage of the main power supply 100 has not been detected, the auxiliary-power-supply control unit 128 maintains the switches 123 and 124 in a closed state in which the switches 123 and 124 are switched on and maintains the switch 125 in an open state in which the switch 125 is switched off. When a decrease in voltage of the main power supply 100 has been detected, the auxiliary-power-supply control unit 128 switches the switches 123 and 124 from the closed state in which the switches 123 and 124 are switched on to the open state in which the switches 123 and 124 are switched off. Thereafter, the auxiliary-power-supply control unit 128 switches the switch 125 from the open state in which the switch 125 is switched off to the closed state in which the switch 125 is switched on.

Specifically, when the source voltage Vb of the main power supply 100 has not decreased, the switches 123 and 124 are maintained in the closed state in which the switches 123 and 124 are switched on and the switch 125 is maintained in the open state in which the switch 125 is switched off.

For example, in the steering unit 4, electric power from the main power supply 100 is supplied to the power circuit 71a of the steering-side control unit 70 via the power supply line L11. Electric power from the main power supply 100 is supplied and charged into the auxiliary power supply 121 via the power supply line L111.

When the source voltage Vb of the main power supply 100 has not decreased and the start switch 110 is turned on, electric power from the main power supply 100 is supplied to the control circuit 72a in the steering-side control unit 70 via the power supply line L21. In addition, since the source voltage Vb of the main power supply 100 is set to be higher than the voltage V2 of the auxiliary power supply 121, electric power from the auxiliary power supply 121 is not basically supplied to the steering-side control unit 70 via the power supply line L113 and a part of the power supply line L21. The diode 126 restrains electric power of the main power supply 100 passing through the power supply line L21 from flowing into the auxiliary power supply 121 via the power supply line L113.

When the main power supply 100 fails to operate and the source voltage Vb of the main power supply 100 is lower than the voltage V2 of the auxiliary power supply 121, electric power from the auxiliary power supply 121 is immediately supplied to the control circuit 72a of the steering-side control unit 70 via the power supply line L113 and a part of the power supply line L21. This is because the voltage V2 of the auxiliary power supply 121 is higher than a voltage in the power supply line L2. Even when supply of electric power from the main power supply 100 to the steering-side control unit 70 is stopped due to a failure of the main power supply 100, the auxiliary power supply 121 backs up the supply of electric power to the control circuit 72a.

When the source voltage Vb of the main power supply 100 further decreases and the source voltage Vb of the main power supply 100 is lower than the threshold voltage Vth1, the switches 123 and 124 are switched from the closed state in which the switches 123 and 124 are switched on to the open state in which the switches 123 and 124 are switched off. Thereafter, the switch 125 is switched from the open state in which the switch 125 is switched off to the closed state in which the switch 125 is switched on. Accordingly, electric power from the auxiliary power supply 121 is supplied to the power circuit 71a of the steering-side control unit 70 via the power supply line L112 and a part of the power supply line L11. This is because the voltage V2 of the auxiliary power supply 121 is higher than the voltage of the power supply line L11 due to the failure of the main power supply 100. Accordingly, even when supply of electric power from the main power supply 100 to the steering-side control unit 70 is stopped due to a failure of the main power supply 100, the auxiliary power supply 121 backs up the supply of electric power to the power circuit 71a of the steering-side control unit 70.

In addition, it is conceivable that a diode instead of the switch 125 may be provided in the power supply line L112. With this configuration, when the main power supply 100 fails to operate, electric power from the auxiliary power supply 121 is immediately supplied to the power circuit 71a. However, power loss occurs in the diode. Accordingly, in view of curbing power consumption in the auxiliary power supply 121, the switch 125 instead of a diode is provided in the power supply line L112 for supplying electric power to the power circuit 71a requiring higher electric power.

It is also conceivable that a switch instead of the diode 126 may be provided in the power supply line L113. However, there is following concern in this case. That is, a slight time is required until the switch of the power supply line L113 is switched from OFF to ON after the main power supply 100 has failed to operate and supply of electric power from the main power supply 100 has been stopped. Accordingly, in a period until the switch of the power supply line L113 is switched from OFF to ON, the control circuit 72a may be reset due to instantaneous stopping of the supply of electric power to the control circuit 72a. In this regard, with the configuration in which the diode 126 is provided in the power supply line L113, electric power from the auxiliary power supply 121 is immediately supplied to the control circuit 72a via the power supply line L113 and a part of the power supply line L21 when the main power supply 100 fails to operate. Since the supply of electric power to the control circuit 72a is not stopped, the control circuit 72a is not reset due to a decrease in source voltage thereof.

In this embodiment, the steering-side control unit 70 and the turning-side control unit 80, that is, the steering control device 1, correspond(s) to a system control unit. The diode 127 corresponds to a first diode. The diode 126 corresponds to a second diode. The power supply line L21 corresponds to a first power supply path. The power supply line L113 corresponds to a second power supply path. The auxiliary-power-supply control unit 128 corresponds to an auxiliary-power-supply control unit.

In the steering-side control unit 70, the control circuit 72a has a function of detecting a voltage of electric power supplied via the power supply line L21 as a source voltage Vig1 of the main power supply 100. The source voltage Vig1 is a source voltage at the connection point P16 in the power supply line L21. The control circuit 72b has a function of detecting a voltage of electric power supplied via the power supply line L22 as a source voltage Vig2 of the main power supply 100. The source voltage Vig2 is a source voltage at the connection point P12 in the power supply line L21. Similarly, the control circuit 82a of the main control unit 80a of the turning-side control unit 80 having the same configuration as that of the steering-side control unit 70 has a function of detecting a voltage of electric power supplied via a power supply line corresponding to the power supply line L21 as a source voltage Vig3 of the main power supply 100. The control circuit 82b of the sub control unit 80b of the turning-side control unit 80 has a function of detecting a voltage of electric power supplied via a power supply line corresponding to the power supply line L22 as a source voltage Vig4 of the main power supply 100. The detected source voltages Vig1 to Vig4 are output to the control units 70a and 70b of the steering-side control unit 70 and the control units 80a and 80b of the turning-side control unit 80 via the local network 90 and are shared by the control units 70 and 80.

For example, the control circuit 72a of the main control unit 70a acquires the source voltages Vig2 and Vig4 which are input via the local network 90. The control circuit 72a of the main control unit 70a acquires a vehicle stop flag FLG1 which is input via the onboard network 50 and acquires a turning-side vehicle stop flag FLG1t which is input via the local network 90. The vehicle stop flag FLG1 is information which is generated by the external control unit 60a and output to the onboard network 50 and which indicates an operation status of the vehicle. That is, the vehicle stop flag FLG1 is information indicating that the operation of the vehicle is stopped, that is, that the start switch 110 is turned off and the supply of electric power from the main power supply 100 is stopped. The external control unit 60a is configured to generate the vehicle stop flag FLG1 as a determination result indicating that the operation of the vehicle is stopped by detecting turning-on/off of the start switch 110 or detecting a vehicle speed value V from the vehicle speed sensor 44. The turning-side vehicle stop flag FLG1t is information which is generated based on the vehicle stop flag FLG1 acquired via the onboard network 50 by the control circuit 82a of the main control unit 80a of the turning-side control unit 80 and is information which is acquired from the control circuit 82a via the local network 90 by the control circuit 72a. That is, the control circuit 82a of the turning-side control unit 80 acquires the vehicle stop flag FLG1 which is input via the onboard network 50 similarly to the control circuit 72a. The vehicle stop flag FLG1 acquired in this way by the control circuit 82a is output as the turning-side vehicle stop flag FLG1t to the main control unit 70a of the steering-side control unit 70 via the local network 90.

On the condition that all of i) a condition that the source voltages Vig2 and Vig4 are lower than a threshold voltage Vth2, ii) a condition that the vehicle stop flag FLG1 is acquired, and iii) a condition that the turning-side vehicle stop flag FLG1t is acquired are satisfied, the control circuit 72a determines that the start switch 110 is turned off and the supply of electric power is stopped as the status of supply of electric power from the main power supply 100. That is, the control circuit 72a determines that all of the source voltage Vig2 detected by the steering-side control unit 70 and the source voltage Vig4 acquired by the turning-side control unit 80 are lower than the threshold voltage Vth2. The threshold voltage Vth2 is a value in a range in which it can be determined that the supply of electric power from the main power supply 100 is stopped, the range being experimentally obtained. The threshold voltage Vth2 is set based on the value of the source voltage Vig2 when the supply of electric power from the main power supply 100 is stopped or the source voltage Vig4 assumed to indicate substantially the same value as the source voltage Vig2.

In this embodiment, the conditions regarding the source voltages Vig2 and Vig4 are added and the conditions regarding the source voltages Vig1 and Vig3 are not added when it is determined whether the start switch 110 is turned off and the supply of electric power from the main power supply 100 is stopped. This is because the source voltages Vig2 and Vig4 change to decrease to the threshold voltage Vth2 when the start switch 110 is turned off and the source voltages Vig1 and Vig3 may not decrease to the threshold voltage Vth2 when the start switch 110 is turned off. The reason why the source voltage Vig1 and Vig3 do not decrease to the threshold voltage Vth2 when the start switch 110 is turned off is that supply of electric power may be maintained similarly to the case in which the start switch 110 is turned on by the functions of the auxiliary power supply 121 and the diodes 126 and 127 even when the start switch 110 is turned off.

In the case where it is assumed that the source voltage Vig2 and the source voltage Vig4 have substantially the same value when it is determined whether the supply of electric power from the main power supply 100 is stopped, the control circuit 72a may be configured to compare one source voltage of the source voltage Vig2 and the source voltage Vig4 with the threshold voltage Vth2. In the case where the source voltage Vig1 as well as the source voltage Vig2 is detected to decrease together when it is determined whether the supply of electric power from the main power supply 100 is stopped, it can be estimated that an abnormality of a power supply such as disconnection of the power supply line L21 or L22 has occurred, instead of turning-off of the start switch 110. When an abnormality of a power has occurred instead of turning-off of the start switch 110, fail-safe control for stopping the vehicle or the like can be preferentially performed. In the case where it is assumed that the source voltages Vig1 to Vig4 have substantially the same value when electric power from the main power supply 100 is being supplied, for example, an absolute value of a difference between the source voltage Vig1 and the source voltage Vig2 is information indicating an amount by which the source voltage Vig2 changes to decrease when the start switch 110 is turned off. In this case, it may be determined whether the supply of electric power from the main power supply 100 is stopped by comparing the absolute value of the difference between the source voltage Vig1 and the source voltage Vig2 with the threshold value and using the result of comparison as a condition. In addition, it may be determined whether the supply of electric power from the main power supply 100 is stopped by comparing the vehicle stop flag FLG1 and the turning-side vehicle stop flag FLG1t and determining whether the values of the flags match.

When it is determined that the supply of electric power from the main power supply 100 is stopped, the control circuit 72a performs a process associated with the stopping such that the operation of the steering-side control unit 70 stops. In this case, when the operation of the steering-side control unit 70 is stopped, the control circuit 72a performs the process required for stopping the operation of the steering-side control unit 70, generates a stop permission flag FLG2 as information indicating that the operation is stopped for the auxiliary-power-supply control unit 128, and outputs the stop permission flag FLG2 to the auxiliary-power-supply control unit 128 via the signal line 140. After the control circuit 72a has output the stop permission flag FLG2, the steering-side control unit 70 may not perform any process or may perform a process as long as it is a process which is not affected by sudden stopping of supply of electric power from the main power supply 100 and the auxiliary power supply 121. The same applies to the turning-side control unit 80. That is, the turning-side control unit 80 determines whether the supply of electric power from the main power supply 100 is stopped through the process in the control circuit 82a based on the source voltages Vig2 and Vig4 and the vehicle stop flag FLG1. Then, when the control circuit 82a determines that the supply of electric power from the main power supply 100 is stopped, the turning-side control unit 80 performs a process associated with the stopping such that the operation of the turning-side control unit 80 is stopped, and outputs the turning-side vehicle stop flag FLG1t generated based on the vehicle stop flag FLG1 to the steering-side control unit 70 via the local network 90. That is, the turning-side vehicle stop flag FLG1t is information indicating that the operation of the turning-side control unit 80 is stopped. The stop permission flag FLG2 which is generated in consideration of the turning-side vehicle stop flag FLG1t is also information indicating that the operation of the turning-side control unit 80 is stopped. After the control circuit 82a has output the turning-side vehicle stop flag FLG1t, the turning-side control unit 80 may not perform any process or may perform a process as long as it is a process which is not affected by sudden stopping of supply of electric power from the main power supply 100 and the auxiliary power supply 121.

After the control circuit 72a has output the stop permission flag FLG2, the function of backing up the supply of electric power from the main power supply 100 using the auxiliary power supply 121 is actually stopped and thus the supply of electric power from the main power supply 100 and the auxiliary power supply 121 to the steering-side control unit 70 is stopped. That is, there is a slight time difference between the timing at which the stop permission flag FLG2 is output and the timing at which the supply of electric power from the main power supply 100 and the auxiliary power supply 121 to the steering-side control unit 70 is stopped. This slight time difference includes a time period until the stop permission flag FLG2 is input to the auxiliary-power-supply control unit 128 after the stop permission flag FLG2 has been output or a time period until the auxiliary-power-supply control unit 128 actually stops the operation thereof after the stop permission flag FLG2 has been input.

On the other hand, when at least one of i) the condition that the source voltages Vig2 and Vig4 are lower than the threshold voltage Vth2, ii) the condition that the vehicle stop flag FLG1 is acquired, and iii) the condition that the turning-side vehicle stop flag FLG1t is acquired is not satisfied, the control circuit 72a does not determine whether the supply of electric power from the main power supply 100 is stopped and does not generate and output the stop permission flag FLG2.

On the condition that the stop permission flag FLG2 input via the signal line 140 is acquired, the auxiliary-power-supply control unit 128 performs a process associated with the stopping such that the operation of the steering-side control unit 70 is stopped. In this case, when the operation of the steering-side control unit 70 is stopped, the auxiliary-power-supply control unit 128 switches the connection state of the electrical circuit 122 such that electric power from the auxiliary power supply 121 is not supplied. That is, the auxiliary power supply device 120 stops supply of electric power to the steering-side control unit 70 by stopping the function of backing up the supply of electric power from the main power supply 100 using the auxiliary power supply 121. In this case, the auxiliary power supply device 120 stops the function of backing up the supply of electric power from the main power supply 100 using the auxiliary power supply 121 regardless of the amount of residual electric power in the auxiliary power supply 121.

Accordingly, when the supply of electric power from the main power supply 100 is stopped, the supply of electric power from the auxiliary power supply 121 is avoided by switching the connection state of the electrical circuit 122 and thus the supply of electric power to the steering-side control unit 70 is stopped. In this case, since the supply of electric power from the main power supply 100 is stopped, the steering-side control unit 70 does not continue to operate and stops the operation thereof. The same applies to the turning-side control unit 80. That is, when the supply of electric power from the main power supply 100 is stopped, the supply of electric power from the auxiliary power supply 121 is avoided by switching the connection state of the electrical circuit 122 and thus the supply of electric power to the turning-side control unit 80 is stopped. In this case, since the supply of electric power from the main power supply 100 is stopped, the turning-side control unit 80 does not continue to operate and stops the operation thereof.

The situation in which a decrease of the voltage of the main power supply 100 is detected includes a situation in which the start switch 110 is turned off and a situation in which the start switch 110 is turned on, the main power supply 100 fails to operate, and supply of electric power from the main power supply 100 to the steering-side control unit 70 is cut off. Particularly, in the situation in which the main power supply 100 fails to operate, the source voltage Vig2 and Vig4 are lower than the threshold voltage Vth2, and the vehicle stop flag FLG1, the turning-side vehicle stop flag FLG1t, and the stop permission flag FLG2 are not generated and are not output. In the situation in which the main power supply 100 fails to operate, the auxiliary-power-supply control unit 128 outputs information indicating that fact to the steering-side control unit 70 via the signal line 140. In this case, the steering-side control unit 70 performs control based on the situation in which the main power supply 100 fails to operate. Information indicating the situation in which the main power supply 100 fails to operate is input to the turning-side control unit 80 from the steering-side control unit 70 via the local network 90. In this case, the turning-side control unit 80 performs control based on the situation in which the main power supply 100 fails to operate.

Operations in this embodiment will be described below. According to this embodiment, when the steering-side control unit 70 and the turning-side control unit 80, that is, the steering control device 1, stop(s) the operations, the auxiliary-power-supply control unit 128 can receive the stop permission flag FLG2 as information indicating that the operations are stopped from the steering-side control unit 70. In this case, when the auxiliary-power-supply control unit 128 determines whether to stop the operation thereof, the auxiliary-power-supply control unit 128 can determine whether the operation thereof is to be stopped in consideration of whether the control units 70 and 80 stop their operations.

Figure 4:
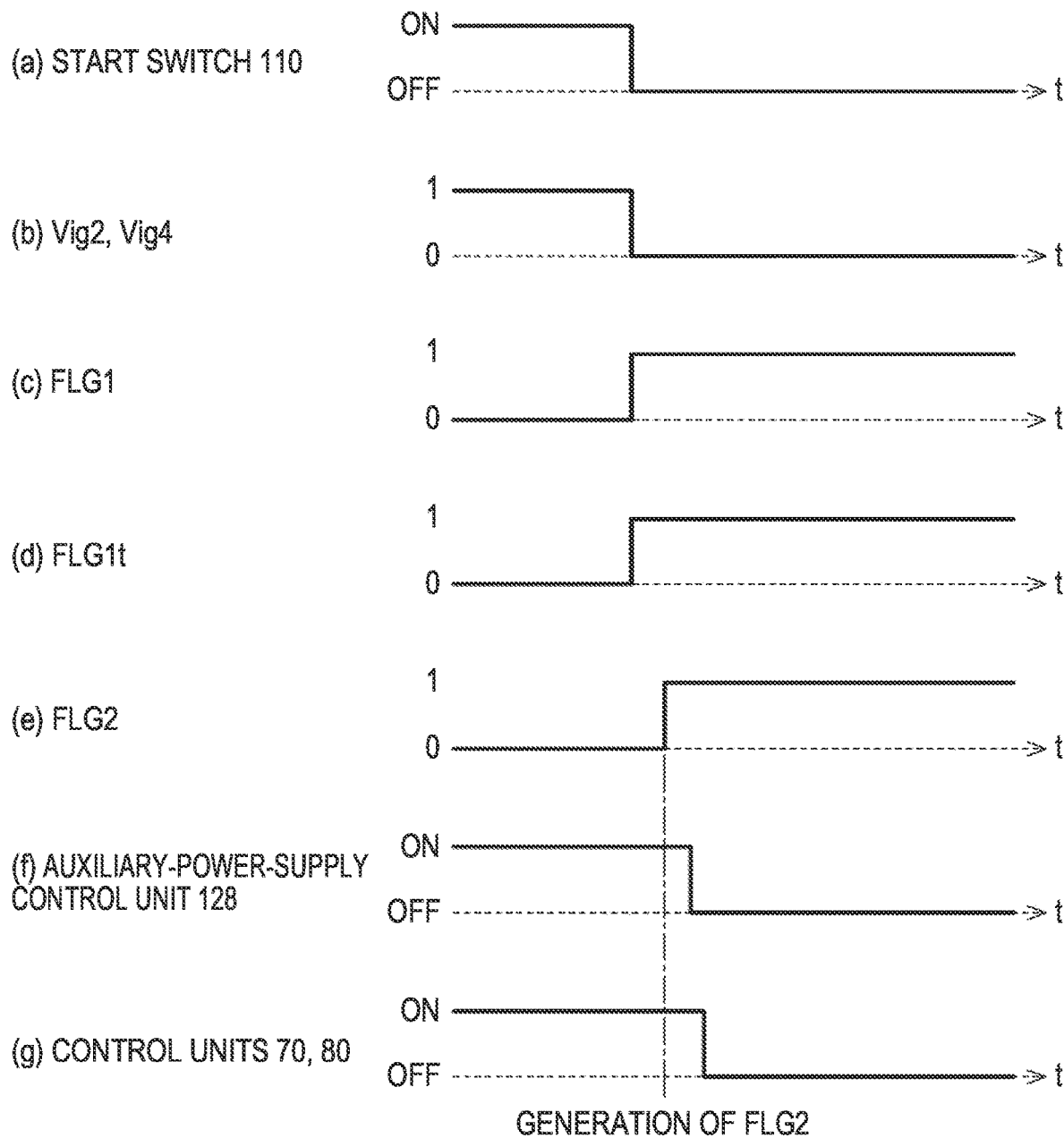

Specifically, a portion (a) in FIG. 4 illustrates that the turning-on/off state of the start switch 110, that is, a state of supply of electric power from the main power supply 100 changes with the elapse of time t. When the main power supply 100 does not fail to operate in the state in which the start switch 110 is turned on, electric power from the main power supply 100 is basically supplied to the steering system 2, that is, the steering-side control unit 70 and the turning-side control unit 80.

In this case, as illustrated in portions (b) to (g) in FIG. 4, for example, the statuses of detecting of the source voltages Vig2 and Vig4, outputting of the vehicle stop flag FLG1, outputting of the turning-side vehicle stop flag FLG1t, outputting of the stop permission flag FLG2, operating of the auxiliary-power-supply control unit 128, and supply of electric power to the control units 70 and 80 in the power supply system S indicate the state in which the start switch 110 is turned on. That is, the source voltages Vig2 and Vig4 are in a status in which the source voltages Vig2 and Vig4 are detected to be equal to or greater than the threshold voltage Vth2, the status being indicated by "1" in the drawing. The vehicle stop flag FLG1 is in a status in which it is not output from the external control unit 60a, the status being indicated by "0 (zero)" in the drawing. The turning-side vehicle stop flag FLG1t is in a status in which it is not output from the control circuit 82a of the turning-side control unit 80, the status being indicated by "0 (zero)" in the drawing. The stop permission flag FLG2 is in a status in which it is not output from the control circuit 72a of the main control unit 70a, the status being indicated by "0 (zero)" in the drawing. The auxiliary-power-supply control unit 128 is in a status in which it operates to perform back-up using the auxiliary power supply 121 when the amount of electric power supplied from the main power supply 100 decreases, the status being indicated by "ON" in the drawing. The supply of electric power to the control units 70 and 80 is in a status in which electric power is supplied to the control units 70 and 80 from the main power supply 100 or the auxiliary power supply 121 such that the control units 70 and 80 continue to operate, the status being indicated by "ON" in the drawing.

Then, when the start switch 110 is switched off as illustrated in the portion (a) in FIG. 4, the supply of electric power from the main power supply 100 to the control units 70 and 80 is stopped. In this case, as illustrated in the portions (b) to (g) in FIG. 4, for example, the statuses of detecting of the source voltages Vig2 and Vig4, outputting of the vehicle stop flag FLG1, outputting of the turning-side vehicle stop flag FLG1t, outputting of the stop permission flag FLG2, operating of the auxiliary-power-supply control unit 128, and supply of electric power to the control units 70 and 80 in the power supply system S indicate the state in which the start switch 110 is turned off. That is, the source voltages Vig2 and Vig4 transition to a status in which the source voltages are detected to be less than the threshold voltage Vth2, the status being indicated by "0 (zero)" in the drawing. The vehicle stop flag FLG1 transitions to a status in which it is output from the external control unit 60a, the status being indicated by "1" in the drawing. The turning-side vehicle stop flag FLG1t transitions to a status in which it is output from the control circuit 82a of the turning-side control unit 80, the status being indicated by "1" in the drawing.

Thereafter, as illustrated in the portion (e) in FIG. 4, after the vehicle stop flag FLG1 and the turning-side vehicle stop flag FLG1t have been acquired by the control circuit 72a of the main control unit 70a, the stop permission flag FLG2 transitions to a status in which it is output from the control circuit 72a, the status being indicated by "1" in the drawing.

Subsequently, as illustrated in the portion (f) in FIG. 4, the auxiliary-power-supply control unit 128 transitions to a status in which the function of backing up the supply of electric power from the main power supply 100 using the auxiliary power supply 121 is stopped on the condition that the stop permission flag FLG2 is acquired, the status being indicated by "OFF" in the drawing.

Subsequently, as illustrated in the portion (g) in FIG. 4, by stopping the operation of the auxiliary-power-supply control unit 128, the supply of electric power to the control units 70 and 80 transitions to a status in which the supply of electric power is stopped such that the control units 70 and 80 do not continue to operate using electric power supplied from the main power supply 100 or the auxiliary power supply 121, the status being indicated by "OFF" in the drawing.

In this way, for example, in the relation with the operation status of the steering-side control unit 70, the auxiliary-power-supply control unit 128 does not continue to operate and can stop the operation thereof in the situation in which the steering-side control unit 70 stops the operation thereof, and the auxiliary-power-supply control unit 128 does not stop the operation thereof and can continue to operate in the situation in which the steering-side control unit 70 continues to operate. The same applies to the turning-side control unit 80. In the relation with the operation status of the turning-side control unit 80, the auxiliary-power-supply control unit 128 does not continue to operate and can stop the operation thereof in the situation in which the turning-side control unit 80 stops the operation thereof, and the auxiliary-power-supply control unit 128 does not stop the operation thereof and can continue to operate in the situation in which the turning-side control unit 80 continues to operate.

Advantages of the first embodiment will be described below. (1-1) For example, when the configuration for generating and outputting the stop permission flag FLG2 is not provided, there is a likelihood that the auxiliary-power-supply control unit 128 will not able to determine that the control units 70 and 80 are to stop their operations even when the control units 70 and 80 are to stop their operations in a state in which the supply of electric power from the main power supply 100 is stopped. When the auxiliary-power-supply control unit 128 tries to continuously operate even in the state in which the supply of electric power from the main power supply 100 is stopped, the auxiliary power supply 121 backs up supply of electric power to the control circuits 72a and 82a instead of the main power supply 100. In this case, since the control units 70 and 80 are continuously supplied with electric power from the auxiliary power supply 121, the control units 70 and 80 fall into an unexpected situation in which they continue to operate even when their operations are to be stopped in the state in which the supply of electric power from the main power supply 100 is stopped. As in this embodiment, this causes a problem particularly when the function of a diode OR that selects electric power from the power supply with a higher supply voltage out of the main power supply 100 and the auxiliary power supply 121 is provided.

On the other hand, in this embodiment, it is possible to set a rule for the control units 70 and 80 and the auxiliary-power-supply control unit 128 to prevent a situation where the control units 70 and 80 or the auxiliary-power-supply control unit 128 continue(s) to operate when the control units 70 and 80 or the auxiliary-power-supply control unit 128 should stop the operation thereof in the relation with the operation status of the other control unit(s), or the control units 70 and 80 or the auxiliary-power-supply control unit 128 stop(s) the operation thereof when the control units 70 and 80 or the auxiliary-power-supply control unit 128 should not stop the operation thereof in the relation with the operation status of the other control unit (s). As a result, it is possible to reduce the possibility that the control units 70 and 80 and the auxiliary-power-supply control unit 128 fall into an unexpected situation.

(1-2) A rule is set such that the control units 70 and 80 stop their operations when the control units 70 and 80 and the auxiliary-power-supply control unit 128 should stop the operations in consideration of the status of supply of electric power from the main power supply 100, that is, the vehicle stop flag FLG1 which is information indicating the operation status of the vehicle. This configuration is effective for allowing the control units 70 and 80 to perform appropriate control based on the operation status of the vehicle.

(1-3) According to this embodiment, it is possible to set a rule such that the control units 70 and 80 serving as a first control unit that can receive the vehicle stop flag FLG1 from the external control unit 60a and the auxiliary-power-supply control unit 128 serving as a second control unit stop their operations when they should stop the operations using the first control unit as a main control unit (a master control unit). This configuration is effective for reducing the possibility that the control units 70 and 80 and the auxiliary-power-supply control unit 128 fall into an unexpected situation.

(1-4) The steering-side control unit 70 determines the operation status of the vehicle using a plurality of pieces of information from different information sources such as the vehicle stop flag FLG1 received from the external control unit 60a, in addition to the source voltages Vig2 and Vig4. In this case, it is possible to improve accuracy of determination as to the operation status of the vehicle.

(1-5) In the steering system 2 employing the power supply system S according to this embodiment, it is possible to reduce the possibility that the control units 70 and 80 and the auxiliary-power-supply control unit 128 fall into an unexpected situation. In this case, it is possible to effectively achieve improvement in marketability of the steering system 2.

(1-6) For example, when the steering-side control unit 70, that is, the steering control device 1, has an autodiagnosis function, that is, a diagnosis function, diagnosis information is generated and stored. The diagnosis information is used for identifying a kind of an abnormality or the like detected as the diagnosis result, at the time of later maintenance. Examples of the kind of an abnormality detected as the diagnosis result include a communication abnormality in which communication between the steering-side control unit 70 and the auxiliary-power-supply control unit 128 via the signal line 140 is not normally performed. Examples of a situation in which the communication abnormality should be detected includes a situation in which the auxiliary-power-supply control unit 128 stops the operation thereof when communication between the steering-side control unit 70 and the auxiliary-power-supply control unit 128 via the signal line 140 is being performed and the steering-side control unit 70 is operating continuously.

In this case, as described in the advantage (1-1), when the configuration for generating and outputting the stop permission flag FLG2 is not provided, the steering-side control unit 70 and the auxiliary-power-supply control unit 128 stop their operations without determining mutual situations in the state in which supply of electric power from the main power supply 100 is stopped. Accordingly, there is a likelihood that a communication abnormality may be detected as the diagnosis result even when the communication abnormality should not be detected. In this case, an abnormality cannot be correctly identified at the time of later maintenance and a decrease in work efficiency of maintenance work or the like may be caused.

In this regard, in this embodiment, it is possible to set conditions such that in a case where a communication abnormality occurs between the steering-side control unit 70 and the auxiliary-power-supply control unit 128 when the stop permission flag FLG2 is generated and output, the communication abnormality is not detected as the diagnosis result. Accordingly, it is possible to reduce the possibility that a communication abnormality is detected as the diagnosis result when the communication abnormality is to be detected in the state in which supply of electric power from the main power supply 100 is stopped.

Second Embodiment

A power supply system according to a second embodiment will be described below with reference to the accompanying drawings. The same elements as in the aforementioned first embodiment will be referred to by the same reference signs and description thereof will not be repeated.

The second embodiment is different from the first embodiment, in that auxiliary power supply devices 120 are individually provided to correspond to the control units 70 and 80 and the single auxiliary power supply device 120 is not shared by the control units 70 and 80.

Figure 5:
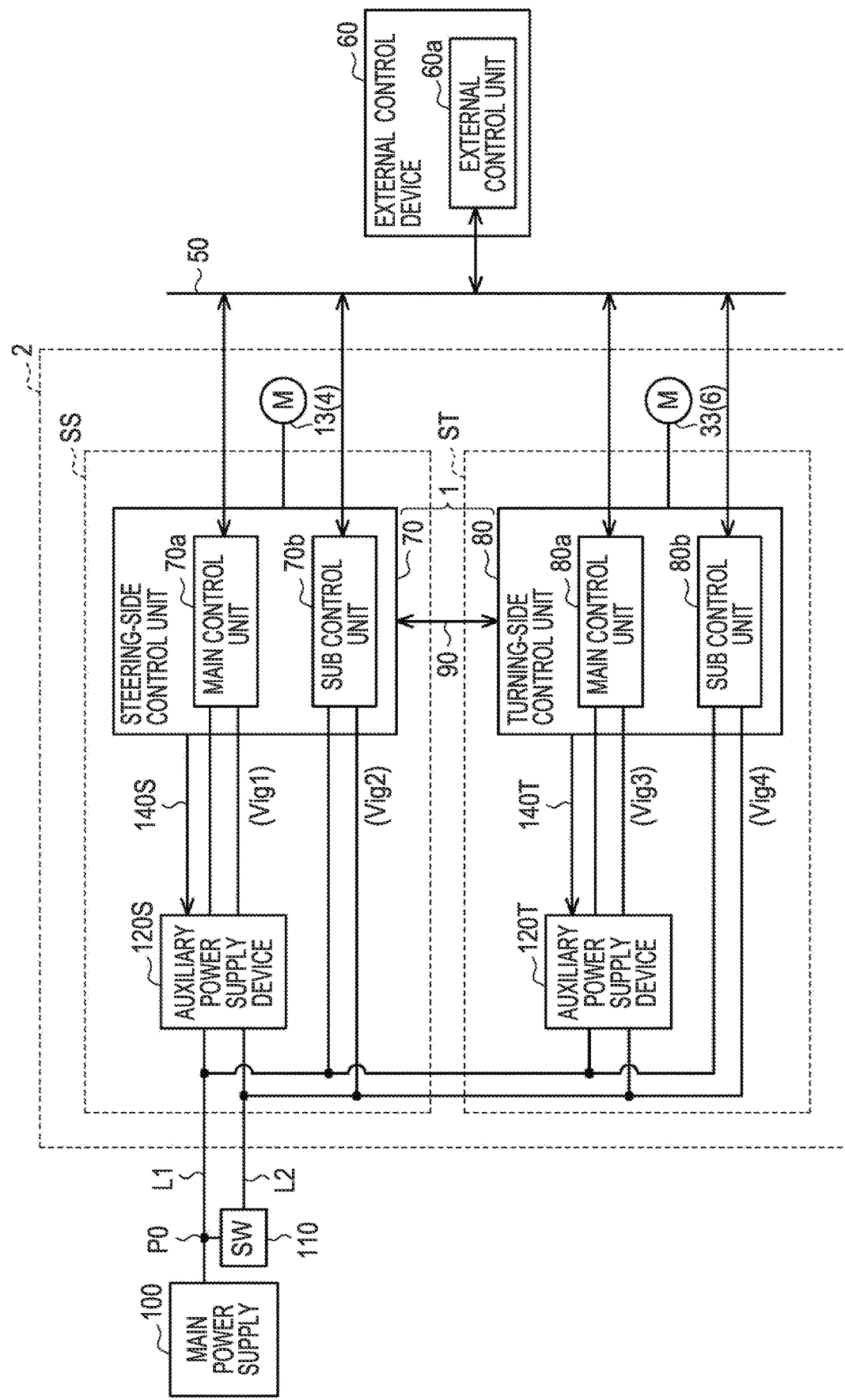
FIG. 5 is a block diagram of a power supply system according to a second embodiment.

Specifically, as illustrated in FIG. 5, a steering-side auxiliary power supply device 120S is provided as an auxiliary power supply device for the steering-side control unit 70. The steering-side auxiliary power supply device 120S and the steering-side control unit 70 constitute a power supply system SS. The power supply system SS is applied as a power supply system for the steering unit 4 in the steering system 2. Similarly, a turning-side auxiliary power supply device 120T is provided as an auxiliary power supply device for the turning-side control unit 80. The turning-side auxiliary power supply device 120T and the turning-side control unit 80 constitute a power supply system ST. The power supply system ST is applied as a power supply system for the turning unit 6 in the steering system 2.

The specific configuration of the steering-side control unit 70 is the same as a configuration in which the steering-side auxiliary power supply device 120S is replaced with the auxiliary power supply device 120 according to the first embodiment. For example, the power supply lines L1 and L2, that is, the main power supply 100, are/is connected to the main control unit 70a of the steering-side control unit 70 via the auxiliary power supply device 120S. The power supply lines L1 and L2, that is, the main power supply 100, are/is directly connected to the sub control unit 70b of the steering-side control unit 70 without passing through the auxiliary power supply device 120S. The auxiliary power supply device 120S is configured to communicate with the main control unit 70a of the steering-side control unit 70 via a dedicated signal line 140S.

The specific configuration of the turning-side control unit 80 is the same as a configuration in which the auxiliary power supply device 120T is replaced with the auxiliary power supply device 120 according to the first embodiment and the turning-side control unit 80 is replaced with the steering-side control unit 70 according to the first embodiment. For example, the power supply lines L1 and L2, that is, the main power supply 100, are/is connected to the main control unit 80a of the turning-side control unit 80 via the auxiliary power supply device 120T. The power supply lines L1 and L2, that is, the main power supply 100, are/is directly connected to the sub control unit 70b of the turning-side control unit 80 without passing through the auxiliary power supply device 120T. The auxiliary power supply device 120T is configured to communicate with the main control unit 80a of the turning-side control unit 80 via a dedicated signal line 140T.

On the condition that both of i) a condition that the source voltages Vig2 and Vig4 are lower than the threshold voltage Vth2 and ii) a condition that the vehicle stop flag FLG1 is acquired are satisfied, the control circuit 72a of the steering-side control unit 70 determines that the start switch 110 is turned off and the supply of electric power from the main power supply 100 is stopped, and generates and outputs the stop permission flag FLG2. Accordingly, the auxiliary power supply device 120S stops supply of electric power to the steering-side control unit 70 by stopping the function of backing up supply of electric power from the main power supply 100 using the auxiliary power supply 121.

On the condition that both of i) the condition that the source voltages Vig2 and Vig4 are lower than the threshold voltage Vth2 and ii) the condition that the vehicle stop flag FLG1 is acquired are satisfied, the control circuit 82a of the turning-side control unit 80 determines that the start switch 110 is turned off and the supply of electric power from the main power supply 100 is stopped, and generates and outputs the stop permission flag FLG2. Accordingly, the auxiliary power supply device 120T stops supply of electric power to the turning-side control unit 80 by stopping the function of backing up supply of electric power from the main power supply 100 using the auxiliary power supply 121.

According to the second embodiment, operations and advantages similar to those in the first embodiment are achieved. The aforementioned embodiments may be modified as follows. The following other embodiments can be combined with each other unless technical conflictions arise.

In the first embodiment, the diodes 126 and 127 may constitute an OR circuit in the steering-side control unit 70, that is, the steering control device 1. With this configuration, electric power from the power supply with a higher supply voltage out of the main power supply 100 and the auxiliary power supply 121 is supplied to the steering-side control unit 70. The same applies to the auxiliary power supply devices 120S and 120T of the second embodiment.

In the first embodiment, an electric double layer capacitor or a secondary battery instead of the lithium-ion capacitor may be employed in the auxiliary power supply 121. The same applies to auxiliary power supplies of the auxiliary power supply devices 120S and 120T according to the second embodiment.

In the first embodiment, the voltage V2 of the auxiliary power supply 121 may be set to the same value as the voltage V1 of the main power supply 100 or may be set to be higher than the voltage V1 of the main power supply 100. The same applies to the voltage V2 of the auxiliary power supplies of the auxiliary power supply devices 120S and 120T according to the second embodiment.

In the first embodiment, the auxiliary power supply device 120 may operate to perform assistance (i.e., provide assistance) by backing up supply of electric power to the control units 70 and 80 instead of the main power supply 100 and to perform assistance by stepping up electric power supplied from the main power supply 100. In this case, a configuration corresponding to the selection circuit such as the OR circuit constituted by the diodes 126 and 127 may be removed from the auxiliary power supply device 120. The same applies to the auxiliary power supply devices 120S and 120T according to the second embodiment.

In the first embodiment, the steering-side control unit 70 may determine whether the start switch 110 is turned on or off using a source voltage Vb instead of the source voltages Vig2 and Vig4. The same applies to the control units 70 and 80 according to the second embodiment.

In the first embodiment, for example, a function of generating information corresponding to the vehicle stop flag FLG1 as a determination result indicating that the operation of the vehicle is stopped by detecting turning-on/off of the start switch 110 or detecting the vehicle speed value V from the vehicle speed sensor 44 may be added to the control units 70 and 80. The same applies to the control units 70 and 80 according to the second embodiment.

In the first embodiment, the steering-side control unit 70 may use at least one of i) the vehicle stop flag FLG1, ii) the turning-side vehicle stop flag FLG1t, and iii) the source voltages Vig2 and Vig4 at the time of determining that the start switch 110 is turned off and the supply of electric power is stopped as a status of supply of electric power from the main power supply 100. The same applies to the control units 70 and 80 according to the second embodiment.

In the first embodiment, the steering-side control unit 70 may not consider the turning-side vehicle stop flag FLG1t at the time of generating the stop permission flag FLG2. For example, the steering-side control unit 70 can output the acquired turning-side vehicle stop flag FLG1t to the auxiliary-power-supply control unit 128 without any change. In this case, the auxiliary-power-supply control unit 128 can perform a process associated with the stopping such that the steering-side control unit 70 stops the operation thereof on the condition that both the stop permission flag FLG2 and the vehicle stop flag FLG1t are acquired.

In the first embodiment, the steering-side control unit 70 may output the acquired vehicle stop flag FLG1 to the auxiliary-power-supply control unit 128 via the signal line 140. The output vehicle stop flag FLG1 is shared by the steering-side control unit 70 and the auxiliary-power-supply control unit 128. From a point of view of sharing the vehicle stop flag FLG1, the auxiliary-power-supply control unit 128 may be configured to acquire the vehicle stop flag FLG1 via the onboard network 50 and to output the acquired vehicle stop flag FLG1 to the steering-side control unit 70 via the signal line 140. In this case, the steering-side control unit 70 can be configured to output the acquired vehicle stop flag FLG1 to the turning-side control unit 80 via the local network 90. That is, the auxiliary-power-supply control unit 128 may be connected to be able to communicate via the onboard network 50. In this case, a function of determining that the operation of the vehicle is stopped, that is, the start switch 110 is turned off and supply of electric power from the main power supply 100 is stopped may be added to the auxiliary-power-supply control unit 128. The auxiliarypower-supply control unit 128 may generate information corresponding to the stop permission flag FLG2 indicating that the operation is stopped and output the information to the steering-side control unit 70 via the signal line 140. In this case, the steering-side control unit 70 can be configured to output the acquired information corresponding to the stop permission flag FLG2 to the turning-side control unit 80 via the local network 90. With this configuration, it is possible to set a rule such that the control units 70 and 80 and the auxiliary-power-supply control unit 128 stop their operations when they should stop the operations using the auxiliary-power-supply control unit 128 as a main control unit (a master control unit). Here, the auxiliary-power-supply control unit 128 is configured to stop the operation or to receive the stop permission flag FLG2 or the like from the control units 70 and 80, when a predetermined period of time set as a period of time in a range in which the control units 70 and 80 can perform an operation stopping process has elapsed after the information corresponding to the stop permission flag FLG2 has been output. The same applies to the control units 70 and 80 or the auxiliary-power-supply control units of the auxiliary power supply devices 120S and 120T according to the second embodiment.

In the first embodiment, the auxiliary-power-supply control unit 128 may be configured to communicate with the main control unit 80a of the turning-side control unit 80 via the signal line 140. That is, the main control unit 80a of the turning-side control unit 80 may be configured to generate information corresponding to the stop permission flag FLG2 in the first embodiment and to directly output the information to the auxiliary-power-supply control unit 128. In this case, the auxiliary-power-supply control unit 128 may be configured not to communicate with the main control unit 70a of the steering-side control unit 70 via the signal line 140. That is, the main control unit 70a of the steering-side control unit 70 may be configured to generate information corresponding to the turning-side vehicle stop flag FLG1t in the first embodiment and to output the information to the main control unit 80a of the turning-side control unit 80.

In the first embodiment, the processing function of determining that supply of electric power from the main power supply 100 is stopped or generating and outputting the stop permission flag FLG2 is not limited to the function of the steering-side control unit 70, that is, the control circuit 72a of the main control unit 70a, and can be appropriately modified as long as the function is realized as a function of the steering control device 1. The processing function may be provided, for example, as functions of both the main control unit 70a and the sub control unit 70b of the steering-side control unit 70 or may be provided as a function of only the sub control unit 70b. The same applies to the main control unit 80a and the sub control unit 80b of the turning-side control unit 80. In this case, the processing function can be provided as the function of the main control unit 70a of the steering-side control unit 70 or the functions of both the main control unit 70a and the sub control unit 70b, and also can be provided as the function of the main control unit 80a of the turning-side control unit 80 or the functions of both the main control unit 80a and the sub control unit 80b. That is, for example, the control units 70 and 80 may employ a technique of performing the determination or the generation of the stop permission flag FLG2 as the processing function and sharing and mediating the results of execution via the local network 90. This technique may be realized among the control units 70a, 70b, 80a, and 80b. The same applies to the second embodiment. That is, the processing function may be provided as functions of both the main control units 70a and 80a and the sub control units 70b and 80b in the control units 70 and 80 or may be provided as a function of only the sub control units 70b and 80b.

In the first embodiment, the control units 70 and 80 may have a function of detecting only a required source voltage. That is, the steering-side control unit 70 may not have a function of detecting the source voltage Vig1 and may have a function of detecting only the source voltage Vig2. The turning-side control unit 80 may not have a function of detecting the source voltage Vig3 and may have a function of detecting only the source voltage Vig4. The same applies to the second embodiment.

In the first embodiment, the main control units 70a and 80a may have the functions of detecting the source voltages Vig2 and Vig4. The same applies to the second embodiment.

In the first embodiment, in the control units 70 and 80, the sub control units 70b and 80b may be eliminated and only one system, i.e., the main control units 70a and 80a may be provided. In this case, the main control units 70a and 80a in the one system may have a function of detecting only a required source voltage. The same applies to the second embodiment.

In the first embodiment, a function of switching off the power supply line L21 at the timing at which the stop permission flag FLG2 is output may be added to the steering-side control unit 70. The same applies to the turning-side control unit 80. That is, a function of switching off the power supply line L21 at the timing at which the turning-side vehicle stop flag FLG1t is output may be added to the turning-side control unit 80. In this case, for example, for the control unit 70, a switch which can be switched by the control circuit 72a or the like may be provided between the connection point P16 of the power supply line L21 and the control circuit 72a. The same applies to the control units 70 and 80 according to the second embodiment.

In the steering control device 1, a single control unit having a function into which the steering-side control unit 70's function to operate the steering-side motor 13 and the turning-side control unit 80's function to operate the turning-side motor 33 are incorporated may be provided.

For example, the turning-side motor 33 may be connected to the rack shaft 22 via a belt type speed reducer using a ball screw mechanism or may be coaxially connected to the rack shaft 22. The steering control device 1 including the control units 70 and 80 may be configured as a processing circuit including (1) one or more processors that operate in accordance with a computer program (software), (2) one or more dedicated hardware circuits such as an application-specific integrated circuit (ASIC) that perform at least some of various processes, or (3) a combination thereof. The processor includes a CPU and memories such as a RAM and a ROM, and the memories store program codes or commands configured to cause the CPU to perform processing. Memories, that is, non-transitory computer-readable media, include all available media that can be accessed by a general-purpose or dedicated computer. The same applies to the auxiliary-power-supply control unit 128 or the auxiliary power supply device 120 including it.

The steering system 2 employs a linkless structure in which the steering unit 4 and the turning unit 6 are normally mechanically disconnected from each other, but the disclosure is not limited thereto and the steering system may employ a structure in which the steering unit 4 and the turning unit 6 can be mechanically disconnected by a clutch 25 as indicated by an alternate long and two short dashes line in FIG. 1. The steering system 2 is not limited to a steer-by-wire steering system, and may be an electric power steering system in which a torque of a motor is applied to the steering shaft 11 or the rack shaft 22.

The aforementioned embodiments are not limited to realization as a function of the steering control device 1 and may be implemented, for example, as a control device for an airbag system, a control device for a brake system, or a control device for a motor serving as a travel drive source in an unmanned transport vehicle or an electric vehicle. For example, the embodiments may be implemented as a control device for a system which is mounted in an object other than a vehicle.

What is claimed is:

1. A power supply system comprising:
a system control unit configured to operate using electric power supplied from a main power supply, so as to control an operation of a system that performs a desired function, the system control unit comprising one or more first processors programmed to execute functions of the system control unit;
an auxiliary power supply provided separately from the main power supply and configured to provide assistance in supply of the electric power to the system control unit according to a status of supply of the electric power from the main power supply; and
an auxiliary-power-supply control unit configured to control a status of supply of the electric power to the system control unit from the auxiliary power supply such that the assistance is provided, the auxiliary-power-supply control unit comprising a second processor programmed to execute functions of the auxiliary-power-supply control unit,
wherein the system control unit and the auxiliary-power-supply control unit are configured to output information of at least one control unit of the system control unit and the auxiliary-power-supply control unit to another control unit of the system control unit and the auxiliary-power-supply control unit, and
wherein the at least one control unit is configured to output information indicating that an operation of the at least one control unit is stopped to the other control unit when the at least one control unit stops the operation of the at least one control unit.

2. The power supply system according to claim 1, wherein:
the status of the supply of the electric power from the main power supply and an operation status of a mounting destination of the system are correlated with each other; and
the at least one control unit is configured to determine whether the operation of the at least one control unit is to be stopped based on the operation status of the mounting destination of the system, and to output information indicating that the operation of the at least one control unit is stopped to the other control unit when the at least one control unit determines that the operation of the at least one control unit is stopped.

3. The power supply system according to claim 1, wherein:
in a case where one control unit of the system control unit and the auxiliary-power-supply control unit is a first control unit, and another control unit of the system control unit and the auxiliary-power-supply control unit is a second control unit,
the first control unit is configured to receive information indicating an operation status of a mounting destination of the system from an external control unit that is provided in the mounting destination of the system separately from the system control unit and the auxiliary-power-supply control unit such that the operation status of the mounting destination of the system is able to be determined;
the first control unit is configured to output information indicating that the first control unit stops an operation of the first control unit to the second control unit when determining that an operation of the mounting destination of the system is stopped, on a condition that stopping of the operation of the mounting destination of the system is determined using the information indicating the operation status of the mounting destination of the system when the first control unit stops the operation of the first control unit; and
the second control unit is configured to determine whether an operation of the second control unit is to be stopped using the information indicating that the first control unit stops the operation of the first control unit, the information being input from the first control unit.

4. The power supply system according to claim 1, wherein the system control unit and the auxiliary-power-supply control unit are configured to determine an operation status of a mounting destination of the system using a source voltage as information indicating the status of the supply of the electric power from the main power supply.

5. The power supply system according to claim 1, wherein:
the auxiliary power supply provides the assistance in the supply of the electric power by backing up the supply of the electric power to the system control unit instead of the main power supply on a condition that there is a decrease in the electric power supplied from the main power supply;
the power supply system further comprises a selection circuit provided between the main power supply and the auxiliary power supply, and the system control unit, the selection circuit being configured to select the electric power from one of the main power supply and the auxiliary power supply such that the electric power is supplied to the system control unit, the one of the main power supply and the auxiliary power supply having a higher supply voltage than a supply voltage of another of the main power supply and the auxiliary power supply; and
the auxiliary-power-supply control unit is configured to control the auxiliary power supply such that the electric power from at least the auxiliary power supply is supplied to the system control unit via the selection circuit while the main power supply supplies the electric power to the system control unit.

6. The power supply system according to claim 5, wherein the selection circuit includes:
a first diode that is provided in a first power supply path which is a path for supplying the electric power from the main power supply to the system control unit; and
a second diode that is connected to a portion of the first diode provided in the first power supply path, the portion of the first diode being located on a side of the system control unit, and the second diode being provided in a second power supply path which is a path for supplying the electric power from the auxiliary power supply to the system control unit.

7. The power supply system according to claim 1, wherein:
   the system is a steering system that is mounted in a vehicle and functions to operate at least one of a steering wheel and a turning wheel which are provided in the vehicle; and
   the system control unit is configured to control an operation of the steering system.

* * * * *